H. L. HALVERSON.
GREASE CUP.
APPLICATION FILED MAR. 27, 1911.
1,118,002.
Patented Nov. 24, 1914.
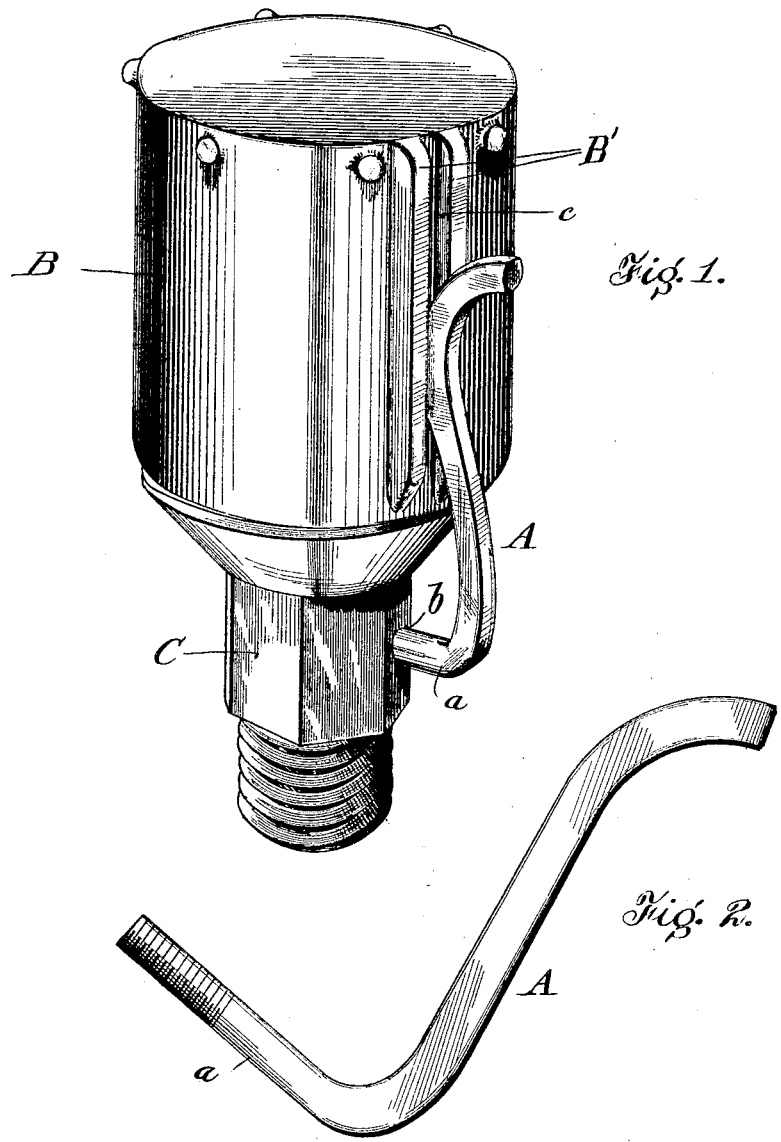
Witnesses.
Helen Cook.
Elizabeth Cook
Inventor:
Halbert L. Halverson,
Per E. T. Cass,
Attorney

UNITED STATES PATENT OFFICE.

HALBERT L. HALVERSON, OF WHITEWATER, WISCONSIN.

GREASE-CUP.

1,118,002.  Specification of Letters Patent.  Patented Nov. 24, 1914.

Application filed March 27, 1911. Serial No. 617,284.

*To all whom it may concern:*

Be it known that I, HALBERT L. HALVERSON, a citizen of the United States, residing at the city of Whitewater, in the county of Walworth and State of Wisconsin, have invented certain new and useful Improvements in Grease-Cups, of which the following is a specification.

This invention relates to improvements in grease cups of that type particularly adapted for feeding grease or other lubricants of a thick character and in which the cup is formed of two parts having a threaded engagement with each other to provide for applying pressure to the body of the lubricant to insure the feed thereof to the bearing to which the cup is connected. In connecting grease cups of this character to bearings, and especially to bearings of automobiles which are subjected to considerable vibration, the parts work loose and become lost or cease to exert pressure on the lubricant, and in some forms of cups which are provided with springs and ratchet means for holding the movable part in adjusted position it is difficult to turn the movable part with one hand. In some cases the cups are used in restricted places impossible or not desirable to use both hands.

It is one of the objects of this invention to provide a grease cup which may be as easily adjusted as the ordinary cups, and when adjusted the movable part may be easily locked in adjusted position.

A further object of the invention is to provide a grease cup in which the tension of the spring may be easily increased or diminished without separating the parts.

With the above and other objects in view, the invention consists of the improved grease cup and its parts and combinations as set forth in the claim, and all equivalents thereof.

In the accompanying drawing in which the same reference characters indicate the same parts in all of the views: Figure 1 is a perspective view of the improved grease cup provided with locking means; and Fig. 2 is a side view, on a larger scale, of the locking member.

Referring to the drawing the letter C indicates the grease cup proper, which is provided on one end with the ordinary threaded stem for connection with a bearing and is externally threaded on its outer enlarged end to receive the internally threaded cup cap B which is adapted to hold the lubricant and to be screwed downwardly on the body portion to force the lubricant out thereof. The cap is provided with two parallel ribs B' to form a groove c extending longitudinally with relation to the bore of the cup and approximately from the top of the bottom edge thereof. The shank a of an angularly formed locking member A is threaded into the stem of the grease cup at the point indicated by the letter b, and the upper end portion of the member is adapted to enter the groove of the cap and hold the cap in adjusted position. The portion of the locking member entering the groove is of a thickness to snugly fit against the side walls thereof and a sufficient length of the member is positioned within the groove to prevent the cap from accidentally unscrewing and turning the locking member out of the groove. The shank of the locking member is loosely threaded into the stem so that the member may be easily turned to spring the member out of the groove and also to adjust the tension of the member. The upper end of the locking member is curved outwardly from the cup to provide a convenient means for disengaging the member from the groove. In adjusting the tension of the member it is only necessary to thread the shank of the member into the stem a greater or less extent to produce the desired tension.

In use the cup is filled in the ordinary manner and the cap is turned on the stem portion to exert a pressure upon the lubricant. When the desired pressure has been obtained the locking member is turned upwardly and the upper end of the member is sprung into the groove of the cap and the cap turned so that the groove will aline with the member to permit the engaging portion of the member to fully enter the groove. When in this position the cap will be securely held against accidental disarrangement.

From the foregoing description it will be seen that the improved grease cup is of very simple construction, may be easily adjusted and locked with one hand.

What I claim as my invention is:

A grease cup, comprising a fixed member, a rotatable cap member movable on the fixed member and adjustable with respect thereto, said cap member having a groove on the side thereof, means for locking the cap in adjusted position to the fixed member, said means comprising a spring finger one end of which is anchored in the fixed member but movable and adjustable with respect thereto whereby the other end may be swung into or out of engagement with the groove in the cap and the tension of the spring finger adjusted.

H. L. HALVERSON.

Witnesses:
R. H. LINDBAUM,
A. D. SPANGLER.

Copies of this patent may be obtained for five cents each, by addressing the "Commissioner of Patents, Washington, D. C."